US012276101B2

(12) United States Patent
Åhsberg

(10) Patent No.: US 12,276,101 B2
(45) Date of Patent: Apr. 15, 2025

(54) METHOD AND ARRANGEMENT IN A FLOOR STRUCTURE DRYING PROCESS

(71) Applicant: Reddo Floor Solutions AB, Stockholm (SE)

(72) Inventor: Johan Åhsberg, Mollösund (SE)

(73) Assignee: Reddo Floor Solutions AB, Stockholm (SE)

(*) Notice: Subject to any disclaimer, the term of this patent is extended or adjusted under 35 U.S.C. 154(b) by 654 days.

(21) Appl. No.: 17/617,340

(22) PCT Filed: Jun. 8, 2020

(86) PCT No.: PCT/SE2020/050575
§ 371 (c)(1),
(2) Date: Dec. 8, 2021

(87) PCT Pub. No.: WO2020/251453
PCT Pub. Date: Dec. 17, 2020

(65) Prior Publication Data
US 2022/0251826 A1 Aug. 11, 2022

(30) Foreign Application Priority Data
Jun. 10, 2019 (SE) .................................... 1950685-6

(51) Int. Cl.
*E04B 1/70* (2006.01)
*E04G 23/02* (2006.01)
(Continued)

(52) U.S. Cl.
CPC ........ *E04B 1/7092* (2013.01); *E04G 23/0285* (2013.01); *F26B 5/12* (2013.01); *F26B 21/001* (2013.01)

(58) Field of Classification Search
CPC ........ F26B 5/12; F26B 21/001; E04B 1/7092; E04G 23/0285; E04G 23/0288
See application file for complete search history.

(56) References Cited

U.S. PATENT DOCUMENTS 5,155,924 A * 10/1992 Smith .................. E04B 1/7092 15/DIG. 7
2005/0257394 A1 11/2005 Claesson
2016/0244962 A1 8/2016 Burton et al.

FOREIGN PATENT DOCUMENTS

CN 105986450 A 10/2016
DE 3632424 A1 4/1988
(Continued)

OTHER PUBLICATIONS

Translation, DE-19813406-A1 (Year: 1999).*
(Continued)

*Primary Examiner* — Jessica Yuen
(74) *Attorney, Agent, or Firm* — Renner, Otto, Boisselle & Sklar, LLP

(57) ABSTRACT

A method and arrangement for drying a water damaged sandwiched floor structure including a top concrete layer, an air permeable isolating layer and a concrete subfloor, comprising providing an air inlet opening and an air outlet opening through the concrete layer, and continuously in a closed loop flowing air through the isolating layer via the openings by a blower and a dehumidifier in serial connection. According to the invention the blower is a suction blower, whereby air is drawn from the outlet opening by the suction blower, and dry air is forced into the inlet opening by the dehumidifier.

4 Claims, 3 Drawing Sheets

(51) Int. Cl.
*F26B 5/12* (2006.01)
*F26B 21/00* (2006.01)

(56) References Cited

FOREIGN PATENT DOCUMENTS

| | | | | | |
|---|---|---|---|---|---|
| DE | 19813406 | A1 | * | 9/1999 | ............ F26B 21/086 |
| EP | 0801720 | B1 | * | 9/1999 | |
| EP | 1923642 | A1 | | 5/2008 | |
| JP | 2001133007 | A | | 5/2001 | |
| SE | 1630308 | A1 | | 6/2018 | |
| WO | WO-9423142 | A1 | * | 10/1994 | ........... E04B 1/7092 |
| WO | WO-03016647 | A1 | * | 2/2003 | ........... E04B 1/7092 |

OTHER PUBLICATIONS

Extended European Search Report for corresponding European Application No. 20823432.8, issued on Jun. 2, 2023.
International Search Report for corresponding International Application No. PCT/SE2020/050575 dated Aug. 12, 2020.
Written Opinion for corresponding International Application No. PCT/SE2020/050575 dated Aug. 12, 2020.
International Preliminary Report on Patentability for corresponding International Application No. PCT/SE2020/050575 dated Mar. 23, 2021.

* cited by examiner

METHOD AND ARRANGEMENT IN A FLOOR STRUCTURE DRYING PROCESS

This application is a national phase of International Application No. PCT/SE2020/050575 filed Jun. 8, 2020, which claims priority to Swedish Application No. 1950685-6 filed Jun. 10, 2019, the entire disclosures of which are hereby incorporated by reference.

TECHNICAL AREA

This invention relates to a method and an arrangement for drying a water damaged sandwiched floor structure including a concrete flooring, an air permeable isolating layer and a concrete subfloor, the method comprising providing an air inlet opening and an air outlet opening through the flooring, and continuously in a closed loop flowing dry air through the isolating layer via the openings by a blower and a dehumidifier in serial connection.

BACKGROUND

A prior art method and arrangement of a similar kind is disclosed in DE 3632424 A1. Therein, the blower is used to force dehumidified air into the inlet opening, whereas the dehumidifier draws moist air from the outlet opening. This prior art is, however, not optimally useful in sandwiched floor structures that are relatively poorly permeable to airflow. The dehumidifier, on the one hand, will then not be effectively capable of drawing the moist air from the outlet opening without being overheated. Trying to increase the blower pressure in order to increase the airflow through the isolating layer, on the other hand, will result in that heated air will escape from the floor structure with danger of spreading bacterial spores and bad smelling air to the adjoining structures and the room environment.

DISCLOSURE OF THE INVENTION

An object of the invention is to obtain a quick an efficient drying process which will increase the temperature in the floor structure only with substantially no process air escaping to adjoining structures and room environment.

In an aspect of the invention the method is further comprised by the blower being a suction blower, drawing air from the outlet opening by the suction blower, and forcing air into the inlet opening by the dehumidifier.

By this reversed serial arrangement, and by instead using a suction blower, as compared to the prior art, a very high suction force can be obtained in the isolating layer and practically no air in the process is capable of escaping to adjoining structures and room environment. The suction blower is also capable of heating the moist air, increasing the efficiency of the drying process.

An arrangement according to the invention has all features necessary for performing the method.

The suction blower may be a side channel blower. A suitably dimensioned side channel blower has an inherent capability of producing a high suction force for drawing the moist air through the isolating layer.

The suction blower and the dehumidifier may be contained in a common casing having a sound and heat insulation therein. The resulting combined drying apparatus will thereby be very energy efficient. The energy efficiency is achieved by the fact that a large amount of the heat is generated by the suction blower. That heat would otherwise be delivered to the environment from the suction blower including its motor and suction and pressure conduits. In the common heat insulated casing the heat can be expediently delivered to be used by the dehumidifier. Heated air supplied into the sorption block of the dehumidifier increases the efficiency of the dehumidification.

Other features and advantages of the invention may be apparent from the detailed description and the appended claims.

BRIEF DESCRIPTION OF THE DRAWING

In the drawing, components having mutually similar functions may be designated by same reference numerals.

DETAILED DESCRIPTION OF EMBODIMENTS

Figure 1:
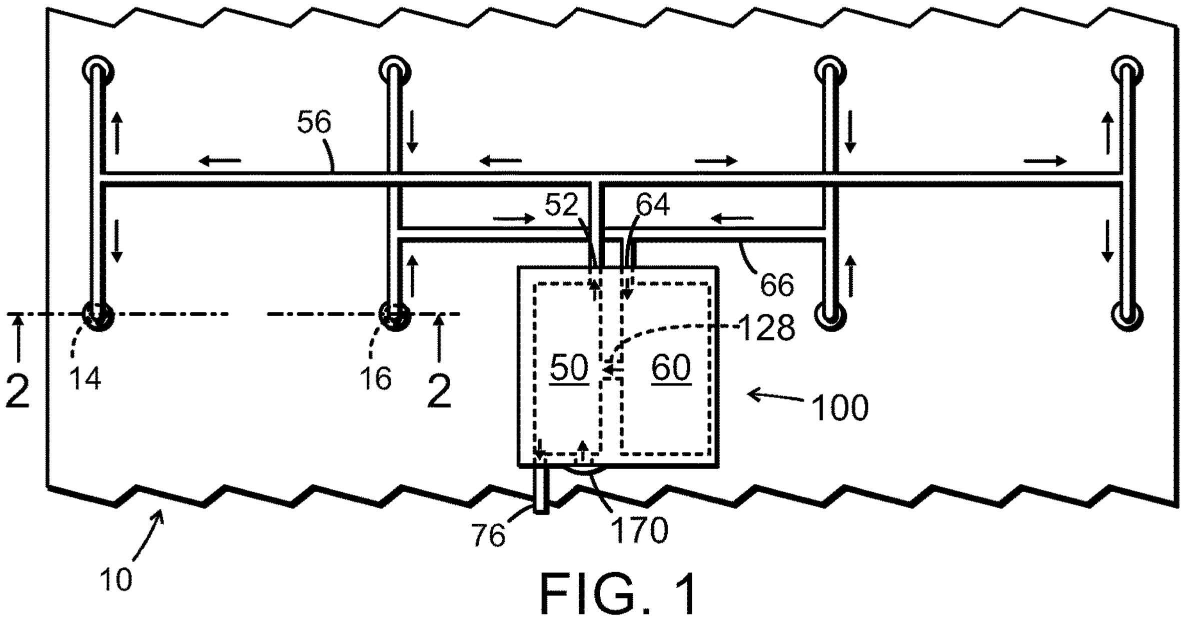
FIG. 1 is a diagrammatic cutaway top plan view of a floor structure being dried according to the method of the invention.
Figure 2:
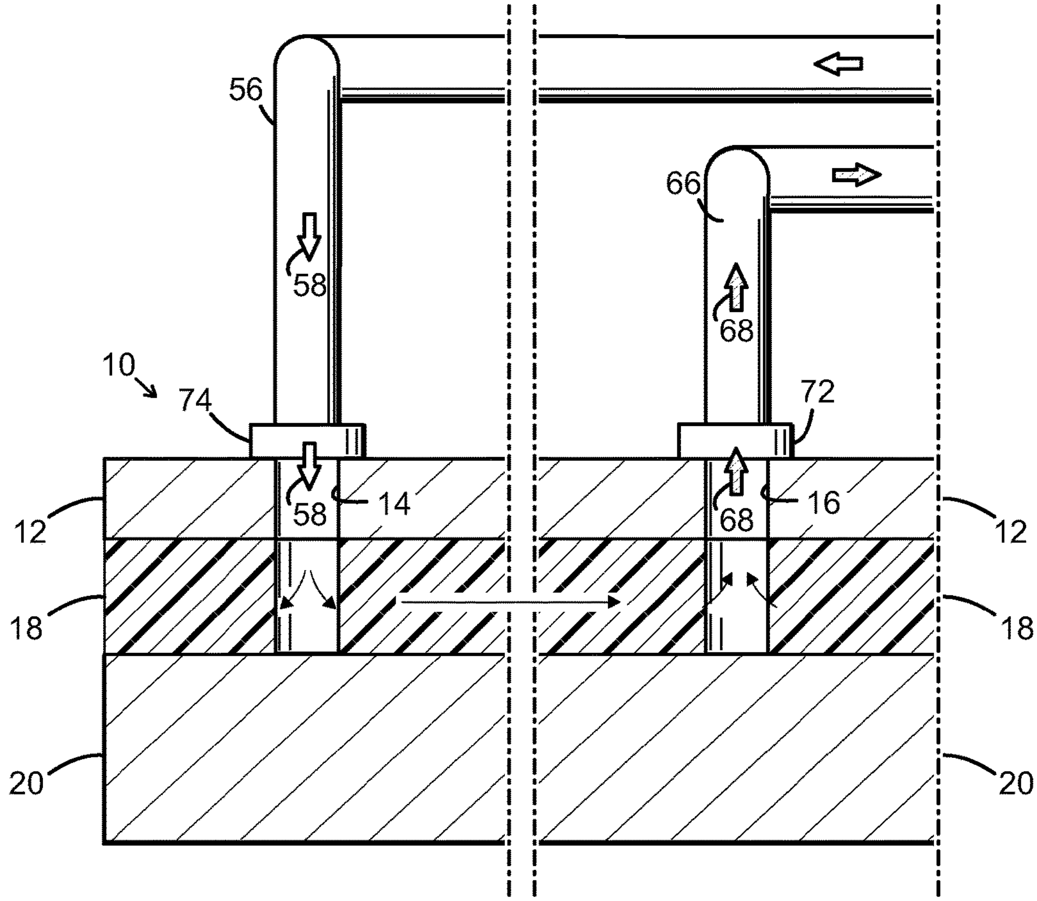
FIG. 2 is a view, partly in section, along line 2-2 in FIG. 1.

The sandwiched water damaged floor structure 10 shown in the example of FIGS. 1 and 2 includes a concrete subfloor 20, intermediate cellular plastics isolating layer 18 and a concrete top layer 12.

Before the drying operation takes place, a flooring (not shown) has been at least partially removed and a number of inlet and outlet openings 14 and 16, respectively, has been formed through the concrete top floor, for example by drilling/boring. While the openings 14, 16 not necessarily need to extend also through the isolating layer 18, this may be convenient and be the common case.

Inlet tubings 56 and outlet tubings 66 are then sealingly connected, for example via respective flanges 74 and 72, to the respective inlet and outlet openings 14 and 16. The inlet tubings 56 are connected to an outlet 52 of a dehumidifier 50 and the outlet tubings 66 are connected to an inlet 126 of a suction blower 60. Dehumidifier 50 and suction blower 60 are serially connected by a conduit 128 and may be arranged as separate units (not shown). In the embodiments shown in the drawings they are, however, arranged in a common casing 102 as a single drying apparatus 100.

Figure 3:
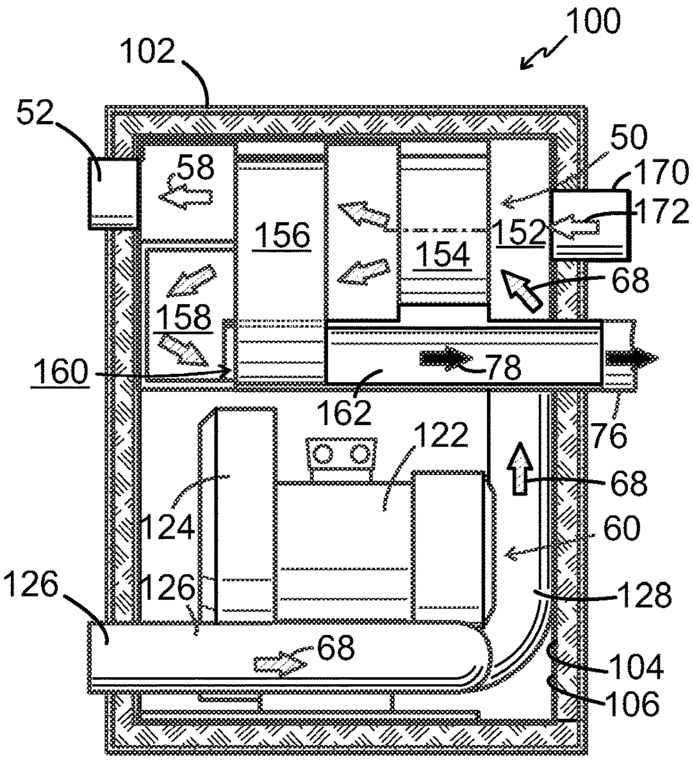
FIG. 3 is a view, partly in section, of a drying apparatus that may be used in the invention.

The drying apparatus 100 according to the invention and shown in FIG. 3 is further provided with a sound and heat insulation inside the casing 102. The sound and heat insulation comprises a laminate having a thicker sound and heat insulating layer 104 and a thinner sound and heat reflecting layer or film 106. The laminate may be adhesively bonded to the interior face of the casing 102.

Inside the sound and heat insulation 104, 106 in the housing 102, the dehumidifier 50 is mounted in parallel with and above the suction blower 60. Specifically, the dehumidifier 50 is suitably installed against one side of the casing 102, and the suction blower 60 is mounted in near heat-conducting contact directly against a bottom face of the dehumidifier 50.

The suction blower 60 is a side channel blower comprising an electric motor 122 and a centrifugal blower housing 124. The suction blower 60 has a suction channel 126, arranged to be connected to the above-mentioned inlet air tubing 66, and an outlet channel 128 connected to an inlet 152 to the dehumidifier 50.

The dehumidifier 50 is a sorption dehumidifier having an inlet 170 for ambient air 172. At the inlet 170 there is a fan, such as a duct fan 154, to further increase the mixed flow of the ambient air 172 and the process air flow 68 heated by the suction blower into the dehumidifier 50. Downstream of the fan 154, the resulting mixed process air is led into a sorption block 156 which may be of the rotary type. The sorption block 156 has an absorbent for accumulating moisture in the process air and is able to divide the output flow into the above-mentioned dry air flow 58 and a wet air flow 78 which is discharged from the dehumidifier 50 through an outlet channel 162 from which it can be discharged through a wet air tubing 76. The dehumidifier 50 also has a regeneration chamber 158 where there is a self-regulating PTC (Positive Temperature Coefficient) element 160 to further heat up the air when needed. Without such a PTC element, the dehumidification would be degraded by the overheating protection being released and the operation thereby deteriorating.

Figure 4:
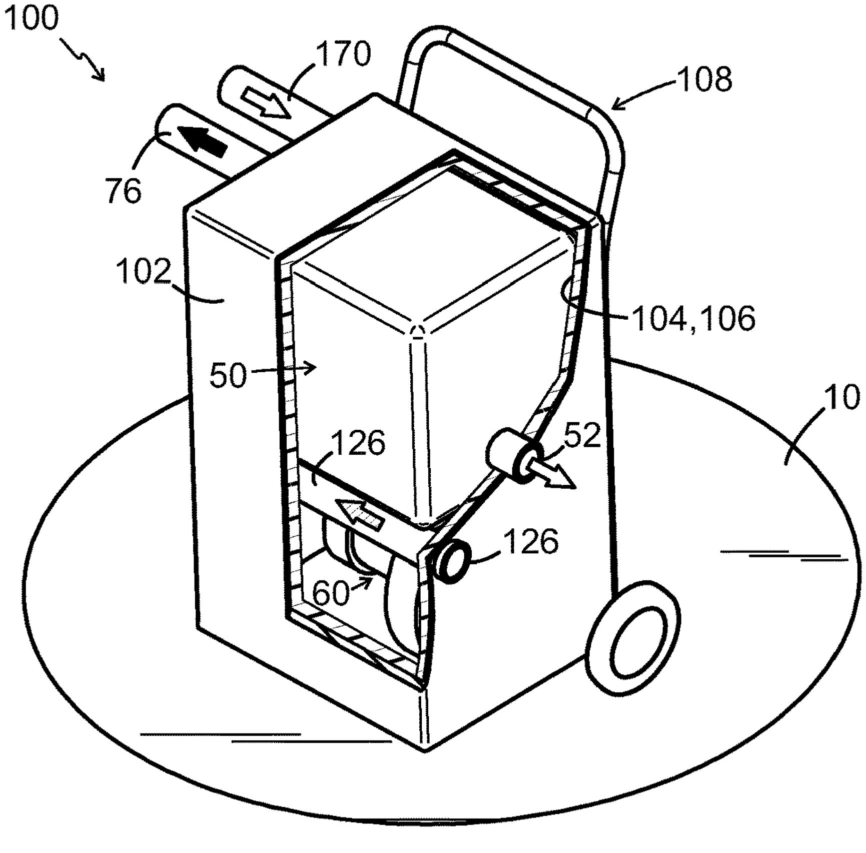
FIG. 4 is an oblique cutaway view of a drying apparatus that may be used in the invention.

In FIG. 4, a slightly modified drying apparatus 100 is further shown mounted on a trolley 108 to be easily moved over shorter distances.

In the example of FIG. 1 the water damage may be located all over the floor structure 10, or more or less concentrated to the central portion of the floor structure 10. In that case the outlet openings 16 may be provided closer to the central portion than the inlet openings 14 as apparent from FIG. 1.

Figure 5:
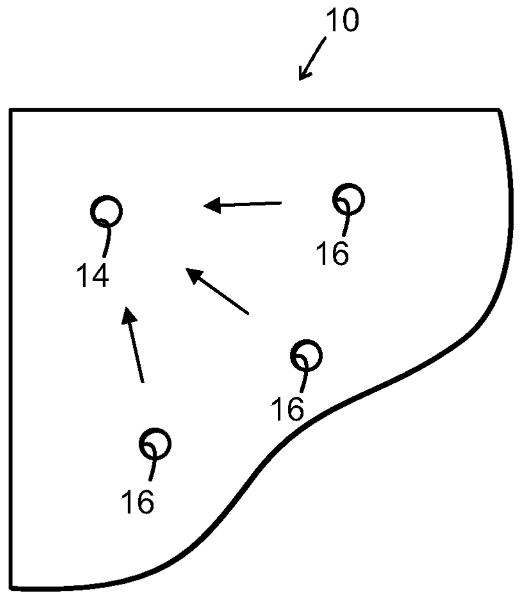
FIG. 5 is a diagrammatic cutaway top plan view illustrating a pattern of openings in a corner area of a floor structure to be dried according to the invention.

In the diagrammatic example shown in FIG. 5 the water damage is located close to a corner of the floor structure. In that case an outlet opening 16 may be provided close to the corner, while for example three inlet openings 14 may be provided at a distance, surrounding the outlet opening 16. In general, the outlet opening(s) should be located close to the water damage, and there may be provided as many or more inlet openings than outlet openings in a floor structure.

The foregoing detailed description is given primarily for clearness of understanding and no unnecessary limitations are to be understood therefrom. Modifications will become obvious to those skilled in the art upon reading this disclosure and may be made without departing from the scope of the appended claims.

The invention claimed is:

1. A method of drying a water damaged sandwiched floor structure having a top concrete layer, an air permeable isolating layer and a concrete subfloor, an air inlet opening and an air outlet opening being provided through the concrete layer, and continuously in a closed loop, the method comprising:

flowing air through the isolating layer via the air inlet and air outlet openings by a suction blower and a sorption dehumidifier in serial connection, with substantially no process air escaping to adjoining structures and room environment, drawing by the suction blower moist air from the floor structure via the air outlet opening, generating heat to heat the moist air, providing the heated moist air into the sorption dehumidifier for drying the heated moist air, and forcing the dry air into the air inlet opening by the sorption dehumidifier.

2. An arrangement for drying a water damaged sandwiched floor structure having a top concrete layer, an air permeable isolating layer and a concrete subfloor, the concrete layer having an air inlet opening and an air outlet opening therethrough, said arrangement comprising, a suction blower and a sorption dehumidifier in serial connection, and configured for continuously in a closed loop, with substantially no process air escaping to adjoining structures and room environment, to flow air through the isolating layer via the air inlet and air outlet openings, wherein the suction blower is configured to draw moist air from the air outlet opening, generate heat to heat the moist air, and provide the heated moist air via a conduit to the sorption dehumidifier for drying the heated moist air, wherein the sorption dehumidifier is configured to force the dry air into the air inlet opening.

3. The arrangement of claim 2, wherein the suction blower is a side channel blower.

4. The arrangement of claim 2, wherein the suction blower and the dehumidifier are contained in a common casing having a sound and heat insulation.

* * * * *